US012764417B2

(12) United States Patent
Sivan

(10) Patent No.: US 12,764,417 B2
(45) Date of Patent: Oct. 13, 2026

(54) REAL TIME ASSESSMENT OF PICTURE QUALITY

(71) Applicant: SnapAid Ltd., Ness Ziona (IL)

(72) Inventor: Ishay Sivan, Tel Aviv (IL)

(73) Assignee: SNAPAID LTD., Ness Ziona (IL)

( * ) Notice: Subject to any disclaimer, the term of this patent is extended or adjusted under 35 U.S.C. 154(b) by 44 days.

(21) Appl. No.: 19/021,306

(22) Filed: Jan. 15, 2025

(65) Prior Publication Data

US 2025/0159337 A1 May 15, 2025

Related U.S. Application Data

(63) Continuation of application No. 18/139,368, filed on Apr. 26, 2023, now Pat. No. 12,250,452, which is a
(Continued)

(51) Int. Cl.

| | |
|---|---|
| ***H04N 23/60*** | (2023.01) |
| ***G06T 7/00*** | (2017.01) |
| ***G06V 20/64*** | (2022.01) |
| ***H04N 23/67*** | (2023.01) |
| ***H04N 23/68*** | (2023.01) |

(Continued)

(52) U.S. Cl.
CPC .......... *H04N 23/64* (2023.01); *G06T 7/0002* (2013.01); *G06T 7/97* (2017.01); *G06V 20/64* (2022.01); *H04N 23/67* (2023.01); *H04N 23/6812* (2023.01); *H04N 23/80* (2023.01); *H04N 23/951* (2023.01); *G06T 2207/10016* (2013.01); *G06T 2207/10032* (2013.01); *G06T 2207/30168* (2013.01)

(58) Field of Classification Search
None
See application file for complete search history.

(56) References Cited

U.S. PATENT DOCUMENTS 5,831,670 A 11/1998 Suzuki
6,091,911 A 7/2000 Sakano
(Continued)

FOREIGN PATENT DOCUMENTS

EP 2965140 B1 1/2016
JP 2006050494 2/2006
(Continued)

OTHER PUBLICATIONS

Tsung-Jung Liu et al., Image Quality Assessment Using Multi-Method Fusion, 1057-7149/$31.00 © 2012 IEEE, IEEE Transactions on Image Processing, vol. 22, No. 5, May 2013 (15 pages).
(Continued)

*Primary Examiner* — James M Hannett
(74) *Attorney, Agent, or Firm* — May Patents Ltd.

(57) ABSTRACT

A computerized method for computing the photo quality of a captured image in a device image acquisition system, comprising on-board combining of a plurality of quality indicators computed from said captured image and its previous image frames quality indicators and a confidence level for at least one of said quality indicators, and using a processor to determine, based on said combining, whether photo quality is acceptable and taking differential action depending on whether quality is or is not acceptable.

12 Claims, 4 Drawing Sheets

Related U.S. Application Data continuation of application No. 17/666,585, filed on Feb. 8, 2022, now Pat. No. 11,671,702, which is a continuation of application No. 17/189,587, filed on Mar. 2, 2021, now Pat. No. 11,252,325, which is a continuation of application No. 16/867,919, filed on May 6, 2020, now Pat. No. 10,944,901, which is a continuation of application No. 15/992,217, filed on May 30, 2018, now Pat. No. 10,659,682, which is a continuation of application No. 15/582,722, filed on Apr. 30, 2017, now Pat. No. 10,009,537, which is a continuation of application No. 15/007,253, filed on Jan. 27, 2016, now Pat. No. 9,661,226, which is a continuation of application No. 14/437,105, filed as application No. PCT/IL2013/050856 on Oct. 22, 2013, now Pat. No. 9,338,348.

(60) Provisional application No. 61/759,643, filed on Feb. 1, 2013, provisional application No. 61/717,216, filed on Oct. 23, 2012.

(51) Int. Cl.
*H04N 23/80* (2023.01)
*H04N 23/951* (2023.01)

(56) References Cited

U.S. PATENT DOCUMENTS

| | | | |
|---|---|---|---|
| 6,178,294 | B1 | 1/2001 | Sakano |
| 7,130,463 | B1 | 10/2006 | Spangler |
| 7,136,537 | B2 | 11/2006 | Pilu |
| 7,362,354 | B2 | 4/2008 | Lin |
| 7,688,379 | B2 | 3/2010 | Forman et al. |
| 7,920,727 | B2 | 4/2011 | Weng et al. |
| 7,973,848 | B2 | 7/2011 | Koh |
| 7,982,770 | B1 | 7/2011 | Kahn et al. |
| 8,009,198 | B2 | 8/2011 | Alhadef |
| 8,040,382 | B2 | 10/2011 | Kahn et al. |
| 8,081,227 | B1 | 12/2011 | Kim et al. |
| 8,125,557 | B2 | 2/2012 | Chen et al. |
| 8,131,118 | B1 | 3/2012 | Jing et al. |
| 8,244,053 | B2 | 8/2012 | Steinberg et al. |
| 8,264,553 | B2 | 9/2012 | Joshi et al. |
| 8,285,067 | B2 | 10/2012 | Steinberg et al. |
| 8,330,826 | B2 | 12/2012 | Cerosaletti et al. |
| 8,508,622 | B1 | 8/2013 | Anon |
| 8,682,097 | B2 | 3/2014 | Steinberg et al. |
| 9,036,069 | B2 | 5/2015 | Wu et al. |
| 9,154,692 | B2 | 10/2015 | Son et al. |
| 9,232,137 | B2 | 1/2016 | Lammers |
| 9,438,816 | B2 | 9/2016 | Robinson et al. |
| 9,538,083 | B2 | 1/2017 | Lammers |
| 2002/0110286 | A1 | 8/2002 | Cheatle et al. |
| 2002/0172432 | A1 | 11/2002 | Pilu |
| 2004/0012682 | A1 | 1/2004 | Kosaka et al. |
| 2004/0174434 | A1 | 9/2004 | Walker et al. |
| 2005/0270381 | A1 | 12/2005 | Owens et al. |
| 2006/0017820 | A1 | 1/2006 | Kim |
| 2006/0056835 | A1 | 3/2006 | Poon et al. |
| 2006/0250515 | A1 | 11/2006 | Koseki et al. |
| 2007/0195174 | A1 | 8/2007 | Oren |
| 2007/0216787 | A1 | 9/2007 | Lin et al. |
| 2007/0283269 | A1 | 12/2007 | Obrador et al. |
| 2008/0013851 | A1 | 1/2008 | Ishiwata et al. |
| 2008/0013885 | A1 | 1/2008 | Su et al. |
| 2008/0192129 | A1 | 8/2008 | Walker et al. |
| 2009/0251557 | A1 | 10/2009 | Kim et al. |
| 2009/0263028 | A1 | 10/2009 | Kwon |
| 2009/0278958 | A1 | 11/2009 | Bregman-Amitai et al. |
| 2009/0296989 | A1 | 12/2009 | Ramesh et al. |
| 2010/0026872 | A1 | 2/2010 | Jiang |
| 2010/0149361 | A1 | 6/2010 | Takeuchi |
| 2010/0214216 | A1 | 8/2010 | Nasiri et al. |
| 2010/0246939 | A1 | 9/2010 | Aisaka et al. |
| 2010/0290673 | A1 | 11/2010 | Miyashita |
| 2011/0074928 | A1 | 3/2011 | Misawa |
| 2011/0075930 | A1 | 3/2011 | Cerosaletti et al. |
| 2011/0096180 | A1 | 4/2011 | McCloskey et al. |
| 2011/0150447 | A1 | 6/2011 | Li |
| 2011/0193990 | A1 | 8/2011 | Pillman |
| 2011/0222724 | A1 | 9/2011 | Yang et al. |
| 2011/0279700 | A1 | 11/2011 | Steinberg et al. |
| 2011/0292221 | A1 | 12/2011 | Gu et al. |
| 2012/0007996 | A1 | 1/2012 | Bilcu |
| 2012/0086847 | A1 | 4/2012 | Foster |
| 2012/0105662 | A1 | 5/2012 | Staudacher et al. |
| 2012/0133746 | A1 | 5/2012 | Bigioi et al. |
| 2012/0133816 | A1 | 5/2012 | Imai |
| 2012/0177352 | A1 | 7/2012 | Pillman |
| 2012/0182447 | A1 | 7/2012 | Gabay |
| 2012/0201427 | A1 | 8/2012 | Jasinski et al. |
| 2012/0249837 | A1 | 10/2012 | Chen |
| 2013/0038771 | A1 | 2/2013 | Brunner et al. |
| 2013/0050507 | A1 | 2/2013 | Syed et al. |
| 2013/0058561 | A1 | 3/2013 | Cheng |
| 2013/0063538 | A1 | 3/2013 | Hubner et al. |
| 2013/0076856 | A1 | 3/2013 | Wakabayashi |
| 2013/0155474 | A1 | 6/2013 | Roach et al. |
| 2013/0182152 | A1 | 7/2013 | Li |
| 2013/0188866 | A1 | 7/2013 | Obrador |
| 2013/0314511 | A1 | 11/2013 | Chen |
| 2014/0050367 | A1* | 2/2014 | Chen .................... G06V 10/987 382/112 |
| 2014/0320679 | A1 | 10/2014 | Lammers |

FOREIGN PATENT DOCUMENTS

| | | |
|---|---|---|
| JP | 2007208922 | 8/2007 |
| JP | 2008033200 | 2/2008 |
| WO | 2003069559 | 8/2003 |
| WO | 2004030378 | 4/2004 |
| WO | 2011148212 | 12/2011 |
| WO | 2013044983 | 4/2013 |

OTHER PUBLICATIONS

Hector Garcia-Molina et al., Database Systems The Complete Book, 2006 (102 pages).

Christopher J. Fisher, AN-1057 Application Note, Using an Accelerometer for Inclination Sensing, 2010 Analog Devices, Inc. (8 pages).

Che-Hua Yeh et al., "Personalized Photograph Ranking and Selection System," Aug. 23, 2010 (10 pages).

Cavalcanti, et al., "A Survey on Automatic Techniques for Enhancement and Analysis of Digital Photography," The Brazilian Computer Society 2013 (19 pages).

EPO, Supplementary European Search Report for EP 13849379.6, dated Feb. 15, 2016.

Yan Ke, Xiaoou Tang and Feng Jing, "The Design of High-Level Features for Photo Quality Assessment" (8 pages).

R. I. Hartley, A. Zisserman, "Multiple View Geometry in Computer Vision", Cambridge University Press (2004) (673 pages).

L. G. Liu, R. J. Chen, L. Wolf, and D. Cohen-Or, "Optimizing Photo Composition", "Photographic", vol. 29 (2010), No. 2 (10 pages).

* cited by examiner

REAL TIME ASSESSMENT OF PICTURE QUALITY

RELATED APPLICATIONS

This application is a continuation of U.S. application Ser. No. 18/139,368 filed on Apr. 26, 2023, which is a continuation of U.S. application Ser. No. 17/666,585 filed on Feb. 8, 2022 (U.S. Pat. No. 11,671,702, issued Jun. 6, 2023), which is a continuation of U.S. application Ser. No. 17/189,587 filed on Mar. 2, 2021 (U.S. Pat. No. 11,252,325, issued Feb. 15, 2022), which is a continuation of U.S. application Ser. No. 16/867,919 filed on May 6, 2020 (U.S. Pat. No. 10,944,901, issued Mar. 9, 2021), which is a continuation of U.S. application Ser. No. 15/992,217 filed on May 30, 2018 (U.S. Pat. No. 10,659,682, issued May 19, 2020), which is a continuation of U.S. application Ser. No. 15/582,722 filed on Apr. 30, 2017 (U.S. Pat. No. 10,009,537, issued Jun. 26, 2018), which is a continuation of U.S. application Ser. No. 15/007,253 filed on Jan. 27, 2016 (U.S. Pat. No. 9,661,226, issued May 23, 2017), which is a continuation of U.S. application Ser. No. 14/437,105 filed on Apr. 20, 2015 (U.S. Pat. No. 9,338,348, issued May 10, 2016), which is a national phase of, and claims priority from, PCT Application No. PCT/IL2013/050856 filed on Oct. 22, 2013, which claims priority from U.S. Provisional Application No. 61/717,216 filed on Oct. 23, 2013 and U.S. Provisional Application No. 61/759,643 filed on Feb. 1, 2013, all of which applications are hereby incorporated by reference as fully set forth herein.

FIELD

The present invention relates generally to image processing and more particularly to analysis of photographed images.

BACKGROUND

Cameras today, even those with good "auto mode" functions, still rely on the camera user to assess a picture's quality, either at the time of taking the picture, or at a later stage. Certain software, such as Photoshop, offers tools to enhance a picture to an extent. Many users simply take more than one picture, say 5-6 pictures, so they will be able to choose one good one.

Conventional technology constituting background to certain embodiments of the present invention is described in the following publications inter alia:

a. US 20130155474 in which a user of the mobile device is provided with feedback prior to the capturing of at least one image of a paper document which provides the user with at least one instruction for adjusting at least one measured parameter. Parameter values may be combined into a group threshold or total overall quality score, such that the combination of all of the measured parameter values produces an overall quality score which exceeds a defined threshold value before the image can be captured by the camera. According to this publication, "The user can be provided detailed information to assist the user in taking a better quality image of the document. For example, the blurriness may have been the result of motion blur caused by the user moving the camera while taking the image. The test result messages can suggest that the user hold the camera steadier when retaking the image."

b. WO 2006040761/US20070195174 which describe a system in which the interface module further enables to define the scene dynamics of the captured image and attributes of the captured image scene dynamics include image motion speed and motion speed of the subjects and the interface module further enables setting the captured image attributes relative weight for the compution of the total image grade.

c. US20090278958 which describes inter alia that "The scoring of a current base image may be based on scores which have been given to previously captured base images. In such a manner, redundant calculation may be avoided."

d. Other systems such as the following patent documents: U.S. Pat. No. 7,362,354; WO2003069559; USS7688379; US20090263028; US20060017820; US20060056835; U.S. Pat. No. 8,125,557; WO2011148212; U.S. Pat. No. 7,920,727; US20130155474; U.S. Pat. No. 8,040,382.

The disclosures of all publications and patent documents mentioned in the specification, and of the publications and patent documents cited therein directly or indirectly, are hereby incorporated by reference. Materiality of such publications and patent documents to patentability is not conceded

SUMMARY

Certain embodiments seek to utilize camera hardware such as accelerometers, gyros and autofocus lenses, inter alia, to evaluate pictures taken in real time, and actively assist in obtaining the best picture given the circumstances at hand.

Typically, each available sensor, e.g. accelerometers, gyros, sends its raw data to a processing component 400 that outputs a quality indicator e.g. as illustrated in FIG. 1, and FIG. 3. Data may also be sent to Device/surrounding objects 4D position computation component 230 for 4D positioning computation. Raw data may be combined with quality indication from other sensors, such as the camera/lens module 200, that can send its own quality indications. For example, some lens modules can estimate the picture focus quality, as it is a part of their auto focus functionality. Some camera/lens modules may have dual cameras or more for achieving 3D data, sophisticated focusing methods like Lytro light field camera, or their own hardware sensors like Google Glass. All this available data can be sent to component 400 and Device/surrounding objects 4D position computation component 230 for use of their functions. Various quality indicators, depending on device capabilities and implementation, may be employed.

Prior art has used certain independent quality indicators, each giving a quality of one particular aspect of a picture, for a given picture. Some try to quantify the quality by means of a total quality indicator. Typically this is done as follows:

$$QI_{total} = \sum_{i=1}^{n} QI(t)_i$$

Where n is the number of quality indicators (QI), and t is the time of test.

Some implementations use a weight function in computation, but the weight is either constant or can be change by the user manually.

$$QI_{total} = \sum_{i=1}^{n} QI(t)_i * w_i(t)$$

However, in this invention, the weight of one indicator will take into account data from other quality indicator/s e.g. their quality indicator value, weight, confidence level (explained forthwith) in them and their previous value, weight and confidence level. For example, if both device shake quality indicator and/or camera focus quality indicator indicate a poor quality, disregard use of aesthetic quality indicator in total computation, even if user indicated that he would like to give it a high priority. This will prevent the device from taking a picture when the picture is blurry, as is the case in prior art. Once shake is low and focus is optimal, aesthetic QI may be used in total quality computations. One quality indicator's importance or relative weight within the total quality indicator may change over time, if some other quality indicator indicates that the first quality indicator becomes less relevant in quantifying the picture quality.

Furthermore, since each QI algorithm has its own assumptions, and each sensor may have measurement errors, the quality indication (QI) value may therefore not be reliable. Also, a QI value that fluctuates widely may not be reliable, and in certain cases, re-assessment of the quality indicator may be called for. Thus, a "confidence level" in the QI is obtained. These indicators may be relayed to a processing component that analyses the current relevance of each indicator, and with suitable configuration, provides a "total" quality value.

This total quality indicator and its detailed list of quality indicators can be used to give the user accurate feedback on the picture quality, whether and how it fits user preferences (configured in 151, used in total QI computation), and provide detailed suggestions on how to take a better picture, if possible.

Suggestions may be provided as an oral message, typically pre-recorded, as an icon on a screen, or as text. Suggestions may use the recorded images as a template for the suggestions. This may include marking over exposed areas in red, or marking a problematic element with a circle.

The quality indicators' values and total quality indicator can be shown to the user in real time.

Certain embodiments of the present invention include a method which comprises combining data from multiple sensors and multiple quality indicators, using available GPU and CPU, to compute, in real time, each quality indicator, and to form a combined total indicator to be shown to the user before and after he has pressed the shutter button. The user may get, or choose to get, suggestions from the application on how to improve the next shot, using the quality indicators and their correlation.

Further indication to the user can be made if the image is below a certain total quality indicator threshold.

According to one embodiment, quality indications are used to control the lens module 200. For example, focus distance reported may be below hyper focal distance or very short and accelerometer reports movement in direction perpendicular to focus plan. This can be used to find a way to shorten the shutter speed (increase ISO or change aperture for example). Another example may be to change the focus point and possibly focus distance if the object being tracked has moved.

In another embodiment, when the user presses the "shutter" button to take the picture (component 105), the device will wait for the total quality indicator to reach a minimum value/threshold, before taking a full resolution picture as shown in FIG. 1. Ideally, this time will be close to the shutter release time. A timeout mechanism can ensure a full resolution picture will be taken, even if the threshold is not reached in a given time after the shutter is released.

A list of suggestions to the users may be for instance "blurred image due to camera shake", or "blurred subject due to subject movement", or "Image dynamic range is beyond the sensor dynamic abilities—choose area of interest, or take a high dynamic range (HDR) shot".

Embodiments include but are not limited to:

Embodiment 1. A method for computing the photo quality of a captured image in a device image acquisition system, said method comprising:

computing at least one total quality indicator based on at least two quality indicators computed from said captured image and its previous image frames, to determine whether the photo quality is acceptable; and providing a corresponding detailed photo quality feedback.

Embodiment 2. A system according to embodiment 1, where automatically activating the capturing apparatus, once a logical criterion based on said quality indicators is met.

Embodiment 3: A system, according to embodiment 1 where a message provider is operative where at least one appropriate suggestion from a pre-stored table of suggestions on how the digital image can be improved further, where said message is presented as a suggestion to the user.

Embodiment 4: A system, according to embodiment 1 where pictures are taken and saved at each frame, but only pictures with a said logical criterion are marked as so.

Embodiment 5: A system, according to embodiment 1 where the stream of frames is saved as a video and;

quality indicators, user preferences, confidence level, and quality importance are used to quantify video quality.

Embodiment 6: A system, according to embodiment 5, used to give a user suggestions on improvement of the video.

Embodiment 7: A system, according to embodiment 1, where computed QI and their confidence levels are used to change parameters in the lens/sensor module to achieve better total QI.

Embodiment 8: A system and method as in embodiment 1 used for automatic image capturing of at least one picture once a configured total quality indicator meets a minimum threshold, even without the user pressing a shutter button.

Embodiment 9. A system using blur type detection for alerting the user of object movement in a region.

Embodiment 10. A system using blur type detection for alerting the user he is moving too fast in a vehicle to achieve a non-blurred image.

Embodiment 11. A system and method described herein for evaluating video quality.

Embodiment 12. A system with device shake recognition, where a device movement gesture can be used for shutter press indication.

Embodiment 13. A system with device shake recognition, where a device movement gesture can be used for delete picture indication.

Also provided, excluding signals, is a computer program comprising computer program code means for performing any of the methods shown and described herein when said program is run on a computer; and a computer program product, comprising a typically non-transitory computer-usable or-readable medium e.g. non-transitory computer-usable or-readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may whereever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIG. 2 illustrates a hardware and operating system (OS) layer which is operative in conjunction with the functional block diagram of FIG. 1.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF THE DRAWINGS

Certain embodiments of the present invention include a system and method for real time assessment of picture quality produced on a device having multiple sensors, such as a smartphone. In one embodiment, all of the sensors, such as but not limited to an image sensor, accelerometer or gyroscope, are embedded in one device. It may be that they reside in different devices, but send their data to one device where the total indicators are computed.

Figure 1:
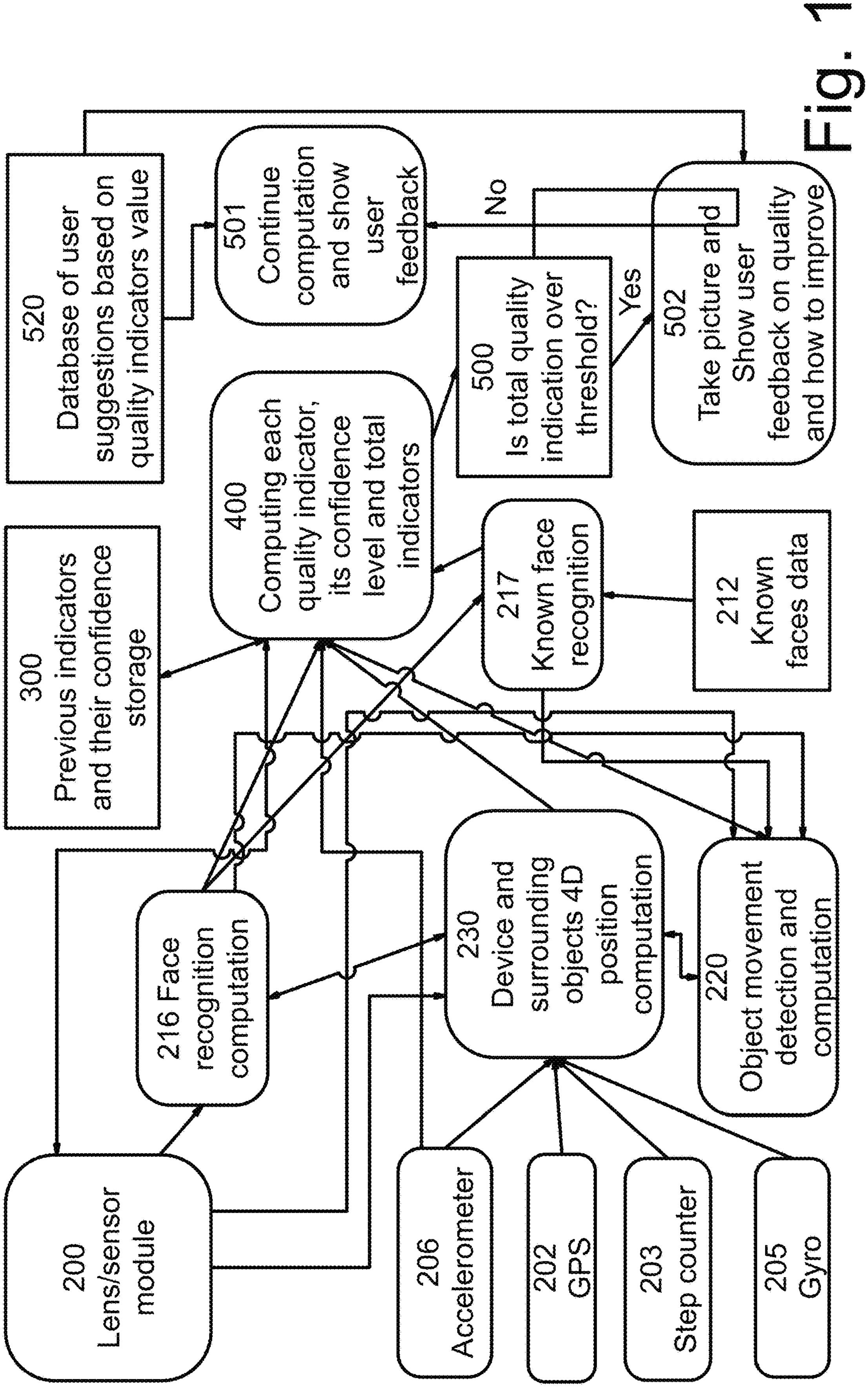
FIG. 1 is a functional block diagram of a system and method for real time assessment of picture quality produced on a device, e.g.
Figure 2:
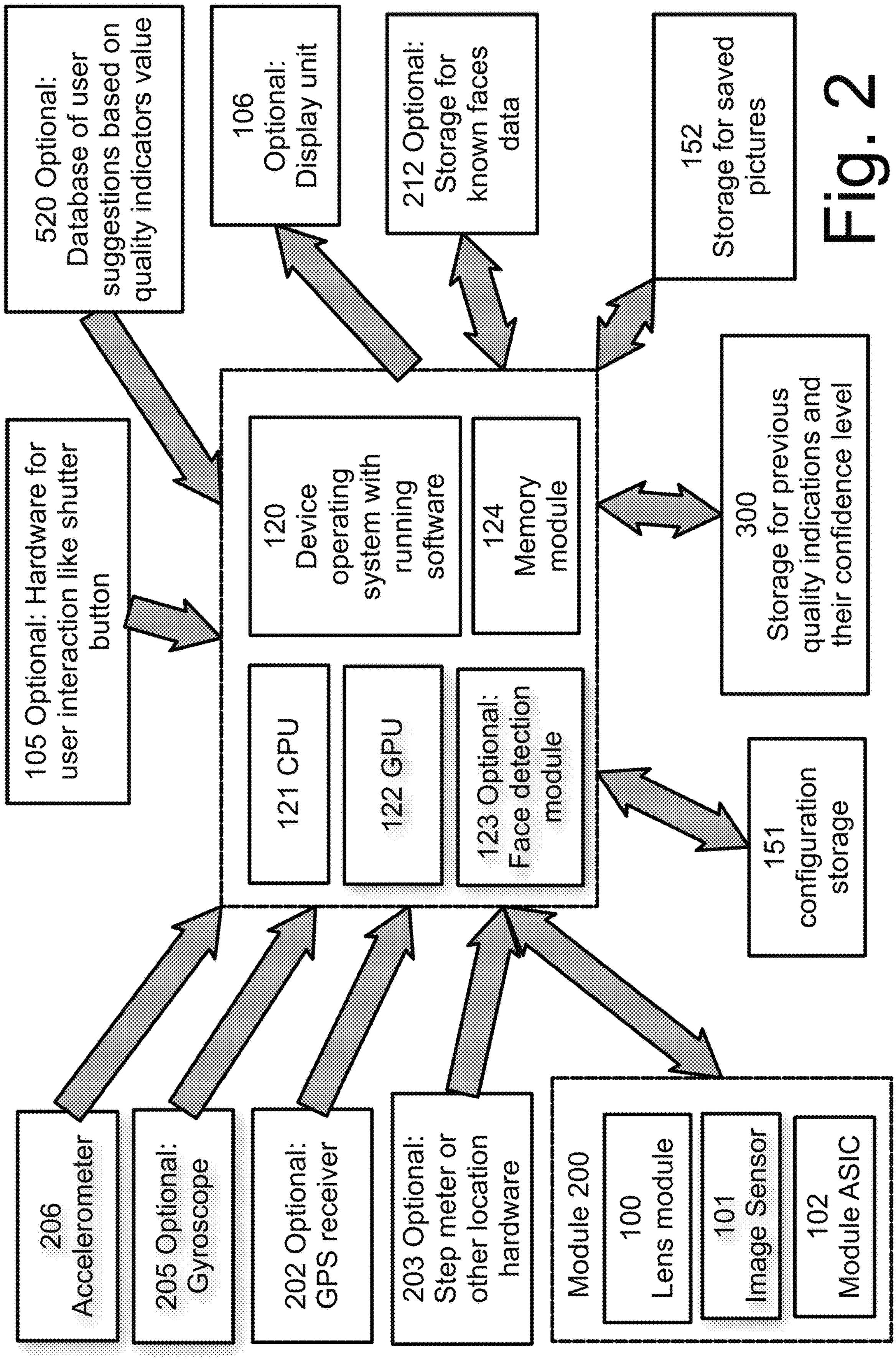
as shown in FIG. 2, having multiple sensors including use of hardware sensor data to generate and utilize picture quality indications.

FIG. 1 is a functional block diagram of a system and method for real time assessment of picture quality produced on a device, e.g. as shown in FIG. 2, having multiple sensors including use of hardware sensor data to generate and utilize picture quality indications.

Referring now to FIG. 1, a Lens/sensor module 200 such as OmniVision OM8865 may be characterized by and/or generate photographic parameters, including but not limited to some or all of:

a) The current image the sensor receives, referred to as a frame or image
b) ISO speed (current, min, max)
c) Is camera focused (yes/no/estimate if available).
d) Aperture
e) Focal length
f) Shutter speed
g) Focus rectangle, or area of interest
h) Sensor type and size—for example BS12 CMOS 1/2.5 inch
i) Depth of Field
j) Scene mode or user preferences.

Figure 3:
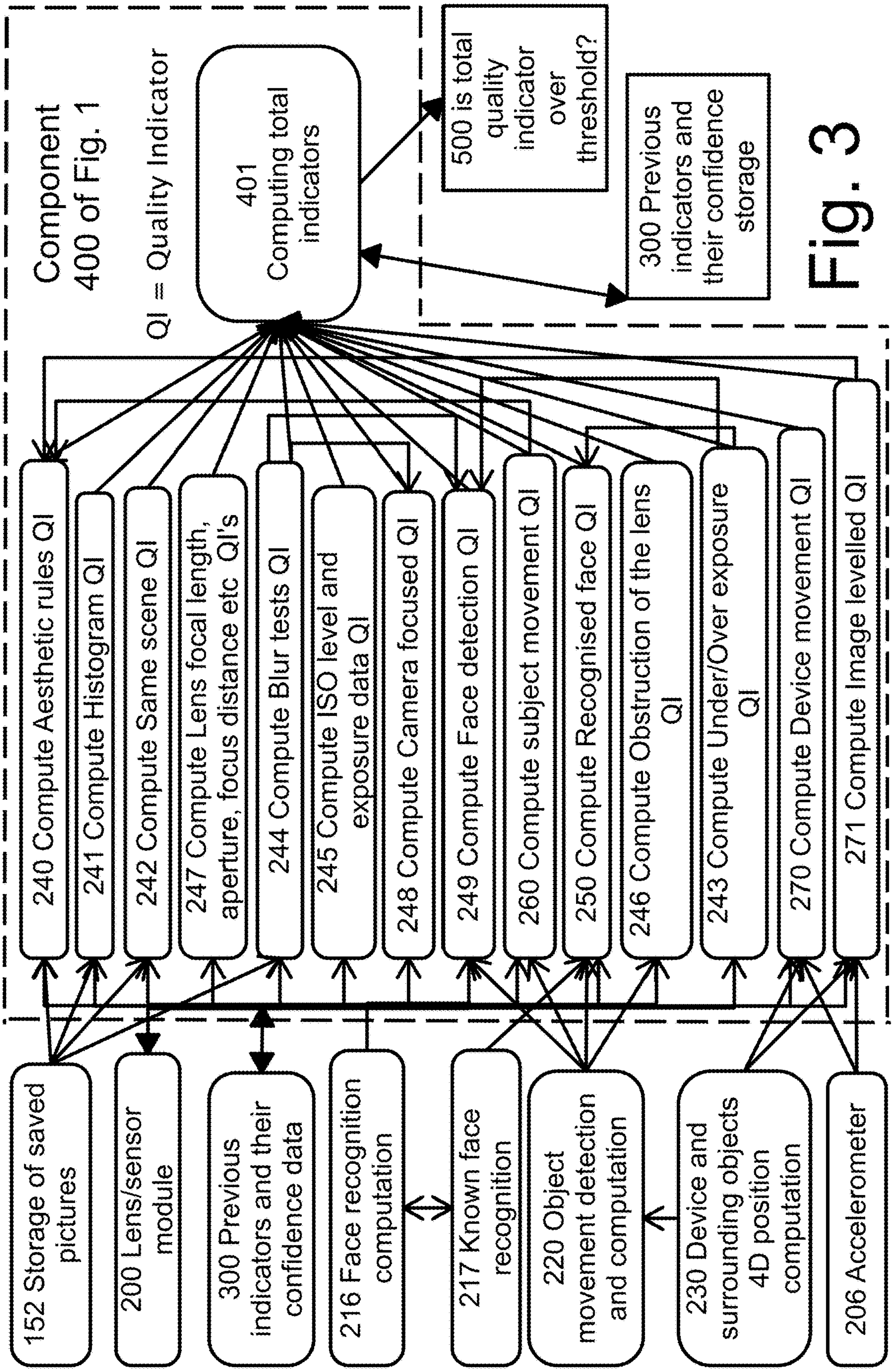
FIGS. 3 and 4 illustrates component 400 in detail and a sample of a quality indicator computation dependence, all according to certain embodiments.
Figure 4:
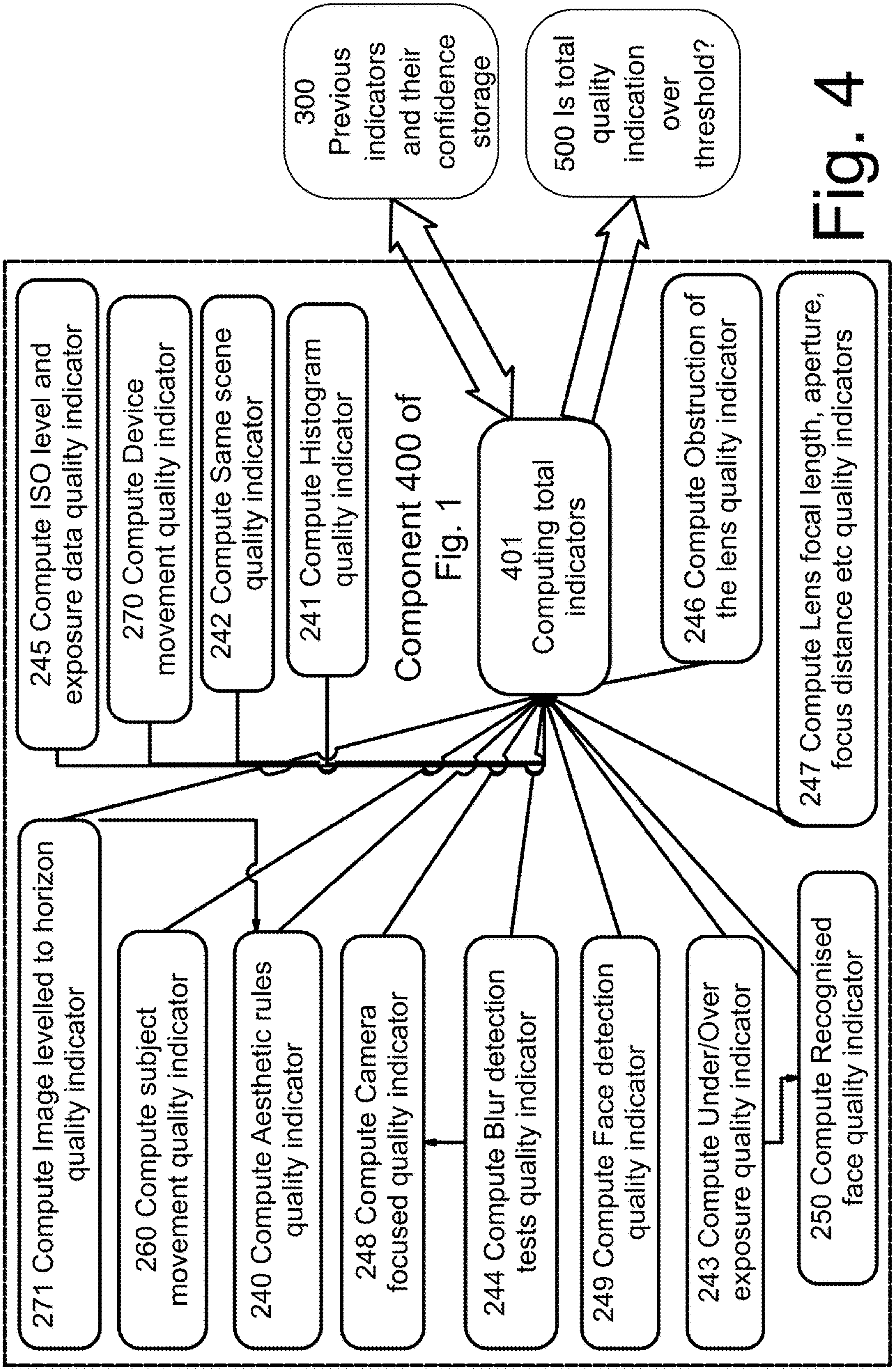

These parameters may be used for computing quality indicator values and their confidence level, as indicated in FIG. 3.

The module 200 sends continuous video frames of the scene in front of the device lens, and data from other sensors is continuously received and analyzed in real time.

Typically, a smartphone includes all such sensor and hardware inside the smartphone. However, it is possible that the image may be sent to the device from an external camera via a cable or Wi-Fi. The image sensor sends its data to the device operating system that may send the whole image or a preview of it to the GPU 122 of FIG. 2 at a rate of X frames per second. This image data is passed on to various programmed GPU vertex and fragment shaders. It is then used for fast computation of some of the quality indicators.

FIG. 2 illustrates a hardware and operating system (OS) layer, which is operative in conjunction with the functional block diagram of FIG. 1.

Errors and Probability in Quality Indicators

When prior art computes a quality indicator value, it was done without taking into account the possibility of error in the computed QI, as all sensors give out errors.

For example, a user wishes to compute a quality indicator for device shake based on data from accelerometers. Accelerometers have precision errors and drifting errors over time. If the user wishes to compute a speed vector, this will be relevant. The speed may be assumed to be 100+−3. A GPS can estimate location and speed errors via its location computation. Errors may also occur as a result of blurriness of some sort, or may result from image resolution and many other factors. For example, assuming a device is moving at a constant speed, and $V_i$ is the computed speed in frame i, where $1 \leq i \leq n$, then if value $V_n$ is 2 standard deviation from the average speed measured so far, (and assuming a normal distribution), then probability for this value is 5%, denoted $P_i(t)$. Most of the time the speed may not be constant, but the above technique can nonetheless can be applied, mutatis mutandis, when errors can be estimated. The probability factor P, is closely related to the nature of the quality indicator and hardware used. For example, a GPS device has its own algorithm for that e.g. Kalman Filters, Beyond mere errors, recognition or pattern algorithms have assumptions that can be related to "probability" of the feature been searched. For example in object recognition, if 4 out of 5 features for this object (face, lamp, chair) have been recognized, a probability P of 80% is indicated. Other examples may be comparison to a similar image for same scene recognition, as objects have moved or just look similar. Aesthetic fit algorithms employ "probability" which pertains to this.

Confidence Level of Quality Indicator

Thus far, only a current image has been illustrated, but previous data can aid in computation of a better confidence level. This depends on the QI in question and the nature of the errors, but assuming a general case, one way of computing the confidence level of $QI_i$ denoted $C_i(t)$ is $$C_i(t) = P_i(t_{j2}) * N(P_i(t_{j2}))$$

$$N(x) = e^{\frac{-(x-\mu)^2}{2\sigma^2}}$$

$$\mu_i = \sum_{k=t1}^{t2} \frac{P(t_k)_i}{k2 - k1}; \;\; \sigma_i = \sqrt{\frac{1}{n} \sum_{k=1}^{n} (P(t_k)_i = \mu_i)^2}$$

$t_{j2}$ is the time of frame j2, the last frame so far.

$t_{j1}$ is the time of minimum frame j1 computation which may be used.

N(x) is a formula for a normal distribution, σ a the standard deviation and μ the mean value. The values in the distribution here are $P_i(t)$ In the formula for computing normal distribution and standard deviation, there is a limit on the "looking back" portion of the computation, so when a significant event occurs at frame j1, it may be reset.

This example uses normal distribution, since nothing is known about the QI at hand, but this need not be the only distribution function. For example, if the location is measured by an accelerometer, accelerometer readout errors and drifting errors over time may be used to construct a better distribution function. For example, an accelerometer distribution function may be different for high acceleration and for low acceleration, since in low values the distribution will be more spread out than in high values.

Mean $\mu_i$ and standard deviation $\sigma_i$ are computed from a specific frame j1 until the current time (or just until the previous frame). This way a significant event in j2 can be an indication to reset j1 to j2, so the computations will not use frames before j2.

In another embodiment, one that doesn't use old data N=1, thus $$C_i(t) = P_i(t_{j2})$$

There may be other methods to compute confidence. For example, GPS location algorithms (such as a Kalman filter) have their own way of computing confidence in the location, especially but not limited to, the mean of error in position. If current GPS data say location has changed 3 meters in the last 15 milliseconds, but accelerometer data shows no change, and assuming that it is known from past computations that speed is relative zero, then the GPS data may not be trusted, and confidence in the GPS QI for movement, is low.

In another example, it may be that the lens module 200 report image is in focus, however independent focus blur QI 244 image is not in focus. This can affect the confidence of QI in component 248, where lens module QI is computed.

One way to compute the confidence level that is dependent on other values can be expressed as $$C_i(t) = P_i(t_{j2}) * N(P_i(t_{j2})) * \prod_{k=1}^{n} f_{ik}(t, QI(t)_k)$$

Where n is the number of available quality indicators, and i and k are running indices of the current quality indicator in question. The function $f_{ik}$ denotes a function specific to these quality indicator correlations. If there is no correlation, the function will be regarded as the scalar 1. In the above example, i being QI in component 248, and one some value $1 \le k \le n$; $k \ne i$ where k is the index for QI in component 244, the value of $f_{ik}$ can be 0.5 if $QI(t)_k < 07$. (In this example all QI and confidence levels are normalized to 1).

More examples of use and computation of confidence levels are now described, as other components and quality indicators are introduced.

Quality Indicators Use of Previous Frames Data

The QI used in the total quality indicator, $QI\_ForTotal(t)_i$ employs the current value of $QI_i(t)$ but also the confidence level. The confidence level is a function of old values inherited by virtue of distribution formula N(t). So if the QI value is significantly different then expected, the QI value's confidence level may drop thereby bypassing a current QI that may be problematic.

Other ways to bypass or wholly or partially discount a current wayward QI value include, say, recognition of an object or face. The object may have been in the field of view one frame ago, with high confidence, say 1/30 of a second ago. Now the QI say the object is no longer there, perhaps with low $P_i(t)$ value. It is possible however that the object in fact is still there; just the recognition algorithm has misses the object. In this example the method may override the current QI with the previous one, at least for a frame or two. More generally, old QI may be employed, particularly if its confidence level exceeds newer QI values, to generate an improved current QI value. One embodiment could be an average of the last few frames that had a high confidence level. The availability of old QI, errors in them via $P_i$, and the computation of $C_i$ provide other methods for determining the value of $QI_i(t)$ e.g. for use in the total indicator. Algorithms of deep learning in neural networks, applied to confidence level data inter alia, may be used to better compute a current value of the quality indicator.

The following are examples of quality indicators and computational functionalities therefor, some or all of which may be provided as shown in FIG. 1:

Blur Detection in Component 244

Image blur can be of 2 types: focus or movement. In order to detect blur, quantify it and alert the user, its origin may be determined, so the user will have information on why the picture has inferior quality.

Blur caused by movement can be either due to the imaging device having moved (usually shake) and/or because the object which was photographed, moved. Both movements refer to the time the image is taken, and the shutter speed.

There are many algorithms for testing blur via frequency distribution in k space transformation such as DCT or other Fourier transform variants, for example prior art US20110096180. Other ways may be testing signal-to-noise ratio and searching for peak signal-to-noise ratio (PSNR). These algorithms can be used to create a blur quality indicator in component 244. This may assist in double checking the camera module 200 own focus assessment used in computation of QI in component 248. This is an advantageous step, since many quality indicators function better when they use previous frames, assuming they are all in focus. Retesting lens/camera module 200 own focus assessment may therefore be helpful.

Device Movement Indication Based on Accelerometer

Camera shake and movement can be quantified using an accelerometer 206 to measure device 3D acceleration, and integrating this over time to determine camera speed. The time of resetting the speed to zero is advantageous, since computation rounding and sensor errors may accumulate over time. This can be done in a few ways, for example: zero speed can be accessed when the device's acceleration is minimal and back and forth over a long time (meaning device is around some point in space), Device Movement Quality Indicator 270

A person of skill in the field of photography would recognize the rule of thumb of focal length which may be reciprocal to the shutter speed if one wants to avoid camera shake due to hand shake. Component 200 provides these two parameters. Device/surrounding objects 4D position computation component 230 provides a position of the device as a function of time in some degree of confidence. Given an average hand jitter speed, one can set a threshold of the accepted speed of the device, For example, assume that for a shutter speed 1/15 of a second, speed may be less than 2 mm per second. 1 mm per second may provide excellent quality, 2 mm per second good quality and 2 cm per second very poor quality. Also a depth of field of the picture (DOF) can to be computed, using the focus distance, aperture of the lens and so on. If the depth of field is small and subject distance is short (macro photography), then movement of the device in the z axis may have a profound effect on quality but for most pictures and devices this is not the case.

For example, a scene with a baby taken from 50 cm away with a Nikon D300, 50 mm focal length lens, aperture of 1.8, means the depth of field may be 2.7 cm. This means that the baby's face may not be fully in focus, and an inferior quality may be indicated. For the same configuration with f/8 aperture, an excellent quality may be indicated.

These computations may aid in determining the importance of movement in the Z exis to the value of the QI. Let a function $I_3(x)$ be the importance of the z axis. In one embodiment $I_3(x)$ may be an exponential function of some sort. The other axes, x and y, each have their own function. They can also have an exponential function, but with a different factor. Given the speed $V_i$ in each direction as given by Device/surrounding objects 4D position computation component 230 the following can be computed:

$$QI_{device\ motion} = \frac{\sum_{1}^{3} I_i(x_i) * V_i(t)}{3}$$

This is one possible method for computation of the base QI for device motion which is not intended to be limiting. Other embodiments may for example use confidence levels.

Component 200 may have some kind of image stabilization—sensor shift, lens stabilization or other. In this case the lens or sensor movement speed in these image stabilizations may be incorporated into the speed $V_i(t)$ in the formula above, for the QI to be correct. If this cannot be achieved with sufficient accuracy, the errors may be incorporated into this QI confidence level.

Object Movement Component 220

There are many methods of computing a motion vector. A block matching method may be used, or a gradient method, etc., or if the motion vector information is included in the input image signal in some form, this information may be utilized. The motion of the objects in the image frame is caused by the combination of two factors: real object movement and apparent movement caused by device movement.

When computing object speed in the image frame, one must subtract the device movement as computed in Device/surrounding objects 4D position computation component 230 from the object speed vector computed.

Methods of statistical pattern recognition may be used to fully recognize actual objects, such as a chair, a tree, a face or a car. If either the imaging device or object is moving, the identity of the object may be considered as a factor for the related confidence level; e.g. a car is much more likely to be moving during imaging than is a tree. Objects that are in the focus rectangle or area of interest are more significant to quality. If there is some movement at a far end region (or: at a significant distance), this may not greatly affect the quality indicator.

Object Movement Quality Indicator 260

The data from component 220 can be used to create a quality indicator about blur due to subject movement. Normally, no movement would indicate excellent quality, and high-speed movement would indicate low quality.

Some objects are more important than others for a "good" picture. For example, often a face is more important than a chair. In order to compute this subject movement quality indicator, each object may be recognized and its movement vector and significance may be factored into the quality indicator dependent on this object's movement.

This computed data may be used to alert the user of motion of a specific object that is considered important such as a face located in the center of an image. One way of computation of this quality indicator, noted $QI_{subject\ movement}$, may be:

$$QI_{subject\ movement} = \frac{\sum_{n} A(x_i) * B(x_i) * S(x_i)}{n}$$

where A(x)—binary/multi-value indicator: is object inside or outside of; within, close to or far from, the focus/interest area rectangle B(x)—importance of object to a picture S(x)—object speed factor. A desired speed may be assigned a "high" value of 1, and 0 may be assigned for non-desired speed, with possible values in the middle. If the object is not to look blurred, it should be standing still relative to the current shutter speed. In that case a high value may be a slow speed. However, speed of an object may be desirable, e.g. to create the artistic impression of movement in the picture. In such a case, a high value may be assigned to a high speed. Each factor is normalized to 1 in this example.

In one embodiment, if the motion vector's estimation quality is not sufficient, the camera module may be instructed to take a picture of a different exposure, say a shorter one, to measure the movement more precisely.

Computing Object Motion Vector Via Corners Detection

Algorithms such as Harris corner detection or its variants such as Shi Tomas corners detection may be used to determine whether the new image frame has more or less details than the previous frame. This determination may be combine with data from the gyroscope and accelerometer, if provided, to indicate whether or not the device has moved and/or the quality has severely deteriorated or increased.

The total quality indicator can be shown to the user in real time. Also, given a configurable "minimum" quality, an indication to the user can be made if the image total quality indicator is below this minimum.

In each region, the number of corners are counted and their center of gravity is computed. This is done for each region on each frame. The path of each center of gravity may then be followed over each region and a motion vector may thereby be computed. This may be feasible if the speed of the object is slow, since when the speed is quick, the corners may become blurred.

Image Leveled to Horizon Quality Indicator 271

The device gyroscope 205 and accelerometer 206, both of which may or may not be provided or available, may be used to compute device angle to the horizon, or how the device is leveled. Using this data, a quality indicator for "device leveled according to its orientation", is computed. For example, zero to 3 degrees is "excellent" quality, 3 to 5 degrees is "good" quality and so on. The user may hold the device either horizontally or vertically.

Camera Focus Quality Indicator 248

As already mentioned, component 200 may send to component 248 data if component 200 is currently in focus, thereby to form an "excellent" quality indicator level for already-focused and "bad" quality indicator for still-focusing. Some camera modules may provide a focus estimation of their own. In such cases, this may be incorporated into or replace the quality indicator to provide more than a yes/no quality indication.

Furthermore, when the lens focuses, the frames received from the camera module are blurred, so the quality indicators related to the blur or object motion detection may be affected. In one implementation, the frames with low focus quality, may be removed when computing these quality indicators.

The lens/camera module 200 may also report its own focus confidence level.

Ideally, the focus indication sent by component 200 may coincide with component 244 QI. However, if it does not, say 244 indicates out of focus and 200 indicates in focus, this can be used to lower 248 confidence level, as demonstrated in the confidence level section.

Face Detection Quality Indicator 249

This quality indicator indicates whether there is a face or faces and whether the face is smiling and/or looking at the camera. These indicators are passed on to a component 249 that analyzes the relevance of each of them, and yields a "total" quality value for this quality indicator.

Furthermore, one may determine if each face is smiling and/or looking at the camera. This data may be used for a quality indicator. For example, a scene in which over 90% of the faces are looking at the camera and 80% are smiling, equals "excellent" face quality, while a scene in which none are looking and none are smiling indicates "bad" quality. Importance of the smiling/not smiling factor may be configured by the user via component 151.

Recognized Face Quality Indicator 250

The device may have a list of configured faces to recognize and for each, pre-stored, their importance, say a user family member or work colleague. The data may also include specific face features. This is denoted as component 212, Recognition of these faces in component 217 may be used by component 250 to produce a quality indicator based on importance as well as face quality, as before. Face importance may change over time by the user, or automatically, by learning user preferences. Confidence level may be computed similarly to 249. However, since it is a known person, more data may be obtained to enhance face recognition, such as face features from various angles, glasses, etc.

ISO Level and Camera Hardware Exposure Data 245

Data such as ISO level, exposure time, focal length, and aperture and focus area is sent from the lens/camera module 200.

Depending on the device capabilities, such as maximum and minimum ISO, a quality indicator is produced. High ISO gives bad quality vs low ISO that gives a high quality indicator.

An optional exposure time quality indicator may be created, if a minimum exposure time is configured.

Lens Focal Length, Aperture, Focus Distance, Sensor Type and Model and Depth of Field 247

Depending on the device capabilities to change focal length and aperture, and given a known configured scene, a quality indicator may be provided to indicate how these parameters confront the given scene. For example, if the scene is a portrait and no face is detected by component 216 yields a bad QI.

Another example may be to use the sensor type and model (component 200) to yield a QI related to it—professional quality may yield good quality, when a poor quality, less costly component, yields poor quality.

Another embodiment for this QI is for testing background blurring, which may sometimes actually be desired. For example, a scene with face recognition in 216 and a very small aperture, say f10 with focus distance in the hyper focal distance of component, 200 yields a bad quality, whereas a wide aperture, say f2.8 on these conditions, yields a good quality.

Under and Overexposed Quality Indicator 243

Given configurable under and over thresholds (say 5% from pure white and 3% from pure black) the image frame given to the GPU is processed to compute areas that are underexposed and areas that are overexposed, e.g. similar to the zone system by Ansel Adams known in the field of photography.

The image frame is divided to a configurable number of areas; say 256 areas or 1024 areas. If a configurable number of percentages of pixels in an area (say 95%) are under or over exposed, the area is marked as under or over exposed. If the image sensor or operating system supports scene recognition/scene mode, or object recognition is present, then the image sensor or operating system may be used in the evaluation of this quality indicator. For example, if the sun or a lamp is the brightest area in the image, they may be ignored. A point of bright light like the sun or a light bulb may be recognized by their pattern and may be ignored.

On another embodiment, the computation may be based on percentage of over and underexposed pixels in the image.

An image in which a large percentage is marked as over or under exposed, say over 40%, may get a bad over/under quality indicator. The same thresholding method may be used for the method of areas described before e.g. if over 40% of 256 areas are considered over exposed.

In another embodiment, pixel or areas inside or outside the focus area of the picture, as given by the lens/camera module 200, may have a different weight e.g. pixels or areas outside the focus area may have a lower affect on the quality indicator value.

This indicator may be used to indicate to the device that an High dynamic range (HDR) shot may be taken, and may be done either automatically or by notifying the user. Depending on the device, this may be done automatically by taking 2 pictures with different exposure settings.

Histogram Quality Indicator 241

The under/over quality indicator is a special case of a more general quality indicator taking into account not just the histogram extreme, but also its central part, and also taking into account function structure and lens/camera module 200's available dynamic range.

This may be no reference, or a full reference (meaning in computation there is or there is not a reference to a preferred image), e.g. as in "The Design of High-Level Features for Photo Quality Assessment" by Yan Ke, Xiaoou Tang and Feng Jing.

Obstructing the Lens Quality Indicator 246

Obstructing the lens may occur as a result of putting the finger partly or fully on the lens. For example, in bright conditions there may be a brown-red area in one corner. In dark conditions there may be no light at all in that location. Confidence in having recognized the situation may be enhanced as more frames are taken and the camera is moved around because if there is no obstruction on the lens, then the size of the area previously believed to be obstructed, would change significantly. There may be other objects causing obstruction that may be recognized. If they are recognized, their name can be used in feedback to the user, instructing him to remove the obstruction.

The amount of area and confidence may be used to give this quality indicator a degree/rating between "excellent" and "bad". For example, a finger blocking the lens may look on the image as a brownish area, probably in a corner of the frame. If the color were green, or it is an isolated area in the middle, the confidence would be low.

For the previous example (finger blocking appearing as a brownish area) the confidence is high.

Functionality 230—Measuring Distance to Objects and Creating a 4D Environment Measurement in Real Time e.g. by Computation of Device/Surrounding Objects 4D Position As already described, the speed of the device in each direction may be measured and the distance traveled may be computed.

With the help of a GPS (e.g. based on unit 202 in FIG. 1) and/or step counting hardware (unit 203) accuracy in the range of a few dozen or a dozen or centimetres or even a single centimetre may be computed by a person skilled in the area for the device 3D relative position in time, thereby to yield 4D position.

This could be used by component 270 to yield better QI accuracy. By measuring the boundaries of an object in one location and again in another location, after moving the device, the distance to the object may be measured (assuming the object is still). e.g. via parallax. Parallax is the apparent displacement of an object because of a change in the observer's point of view. Since cameras today easily achieve 8 MP and more, typically, distance can be computed providing parameters such as lens focal length from component 200.

The 3D scene is built according to the input images from the image capturing unit 200 or any other sources. It can be based on multi-view image geometry techniques as introduced in "Multiple View Geometry in Computer Vision" by R. I. Hartley, A. Zisserman, Cambridge University Press (2004). The user may help by moving the device, either by walking a few steps or holding the device at full arm's length and swinging it pointing to the scene in question. However, a full 3D scene reconstruction is not required. A partial reconstruction, including scene change in time, may suffice.

Since the methods used to estimate the distance include integrated estimation, such as the distance is between 2 to 3 meters, a confidence level on each object can be constructed, similar to that described in the confidence level section. Also, since the device position itself may have errors or uncertainties, this also can be used in the confidence level of each object. This confidence level can then be used by quality indicators using this component data, so that they may implement their own confidence level.

Aesthetic Rules Quality Indicators 240

In photography, there exist 'golden rules' for fitting of the composition to a section that may give a better aesthetic looking picture. There are heuristics that provide a means of achieving an eye-pleasing composition such as but not limited to: rule of thirds, golden triangle, golden spiral, shapes and lines, amputation avoidance, visual balance, and diagonal dominance.

For example, when taking a picture on a beach, the sea and sky meet on the horizon 'line'. To fit this rule, one must put the line either at one third-height or two-thirds height, thereby fitting the "rule of thirds". Either one is "correct". However, putting the line in the middle creates a composition that is considered less favorable to the viewer.

There are various methods of testing a fit to this rule, for example in "Photographic", Volume 29 (2010). Number 2 "Optimizing Photo Composition" by L. G. Liu, R. J. Chen, L. Wolf, and D. Cohen-Or.

Further types of aesthetic models exist, based on chroma and exposure. Some may only give a non-reference quality indication without suggestion on coordinate change, as in the previous article. For example, a model is described in published US20130188866.

In another embodiment, multiple aesthetic qualities may be used.

This aesthetic QI can be used for suggestion to the user to move from his current location to another location, together with the other quality indicators like under/over, it may be suggested to the user that he should move from his current location.

For example, a lamp in the street behind a person at night will not be good even if it fits a golden rule. Using data from Device/surrounding objects 4D position computation component 230, we can assess distance to the person's face, say 2 meters, the distance to a lamp of 4 meters height 4 meters behind him, we can suggest to the user that he should move 2 steps to the right and one forward, tilting the device 20 degrees to the left if he wishes to achieve a better aesthetic QI score and a better total QI.

Functionality 242: Same Scene Quality Indicator

One of the problems solved by certain embodiments of the present invention include a processing system to reduce or eliminate any need to take multiple pictures of the same scene, in order to get one good picture. If the proposed system negates this need, it may be helpful to indicate to the user he is taking unnecessary pictures that may only be a burden at a later stage.

This is a heuristic quality indicator, taking into account the time, location of device, angle of device, object movement in the device and other parameters, including but not limited to photographic parameters such as ISO and focal length. It may require these parameters of previous pictures taken in recent time. One possible implementation includes comparing each QI and its confidence data to the QI and associated confidence level of a previously recorded and saved image in the last say 5 seconds (configurable). If the data of each QI is the same, it may be concluded that it is a "bad" same scene quality indicator.

Functionality 400 and 401: Combining the Separate Quality Indicators to Total Quality Indicators As described herein, some quality indicators and their confidence levels may depend on other QI data. For example, aesthetic QI computation 240 may need the data on image leveled to horizon from component 271. If confidence of 271 is very low, it may not use any other data. Some, but not limited to, examples of QI computation components can be seen in FIG. 3.

Some quality indicators may be considered mandatory (unless specifically turned off) since they cause unacceptable blurring of the image:

Focus

Subject movement

Device movement

Each device may have different hardware capabilities, thereby may not yield all the possible quality indicators or may not be able to process detail indicators, due to slow hardware. Some indicators may be ignored, if so configured by the user. One is then left with a set of indicators with which to compute.

A QI use in a total indicator may vary depending on situation. For example, "overexposed" quality indicator computation 243 may use data from object recognition in component 220. If the picture shows a sunset, it is likely that there will be over and underexposed areas, so in one embodiment it may be chosen to decrease importance of a sun-lit area and be less sensitive to overexposed QI in total computation. In another example, face exposure check may be increased if the face quality indicator suggests there is a face.

$$\text{QI\_ForTotal}(t)_i = QI(t)_i * \prod_{j=1}^{n} f_{ij}\left(t,\, QI(t)_j,\, C_j\right)$$

As can be seen in this formula, there is a dependency in the confidence level $C_j$ before it is used, so data of QI with low confidence level may not be used. There may be other ways to formulate these connections. This may be employed as a general case.

$$QI_{total} = \sum_{i=1}^{n} \text{QI\_ForTotal}(t)_i * w(t,\, C_i)_i$$

$W(t)_i$ is the weight of each QI in the total and may be used to ignore QI if desired. $W(t)_i$ is dependent on time, since the user may choose to change it. $W(t)_i$ may be dependent on the confidence level. For example, if it is not desired to include below say 10% confidence, and $w_i$ will be zero if $C_i<0.1$. There can be more than one type of total QI. For example, when computing total QI, and only mandatory QI are chosen (QI's considered mandatory by an application or use case), a mandatory total QI may be provided. This QI may be used to decide when to take the picture, e.g. as described below. Another option is to use all the QI to get a sense of the picture quality as a whole. One can choose to formulate other total QI for other needs.

This formula is just one way to achieve a total indicator that is dependent on quality indicators, their confidence levels and their relations. The idea is to enable a general formula as quality indicators are added or removed in some embodiments, or for different implementations with various levels of complexity and interconnections between QI.

Functionality 502: Taking a Picture at the Proper Time Using Total Quality Indicator It may be that the picture will not be taken when the shutter is pressed, but only when a minimum threshold on specific QI with specific confidence level is met, when a total QI minimum threshold is met, or timeout occurs.

In such cases, the user may be shown, in real time, the QI values and possible suggestions, as indicated in 501. The data for the suggestions may be in 520, where QI and their confidence level may be used to show suggestions. Suggestions can be shown for QI how a value is no good, and confidence level beyond a threshold, say 0.7.

The QI indication user interface may be a number, and may even be an icon representing the quality. For example 5 smiles may each represent a quality indicator. Smiling face—good, crying face—bad, and so on.

A picture, once taken, may be shown to the user with its quality indicators, together with further suggestions on how to improve (for example "image is underexposed in a large area").

The image may not be saved or may be deleted if total QI or any other predetermined QI is below some quality indicator threshold. After the image is saved, the quality indicators may be saved along with the image (one embodiment may be to use the EXIF convention used in JPEG files) so that they may be used at a later stage, such as when a user wants to see the picture quality days after it was taken.

Suggestions to the User on how to Improve the Picture and Component 520

The user may choose to get suggestions from the application on how to improve the next shot. The application may use the quality indicators and their correlation to answer that.

This can be done before a final picture is taken and/or after. The application may use quality indicators, their confidence level, importance and their correlation to respond. This is where the database with user suggestions, component 520, is used. The data in this can be a table of text to be shown for every given QI with a low value. In a more complex embodiment, it can be an SQL table being queried by multiple QI. An example of such a query on the database may be "select * from suggestion_table where QI1>0.9 and QI2<0.2" In this example QI1 can be module 200 ISO speed and QI2 can be device shake QI. The text retrieved can be "Try to use higher ISO speed to counteract device shake". Another example can be QI1 is QI of 248 and QI2 is of 244. The text retrieved can be "focus may be off. Focus one another subject and try again". There may be more complicated queries and embodiments, as a person in the field of databases can easily construct, given ideas from a person in the field of photography.

Text suggestions may be accompanied by an image explaining them. For example, if there is a low quality indicator of under/over exposure, the implication may be presented to the user via text, and overexposed areas on a picture preview may be painted in red, and underexposed areas may be in blue.

The confidence levels may aid in recognizing the best suggestion to be retrieved from a table of suggestions. For example, one my use a QI with confidence larger than 0.5, and show suggestions in the order of confidence levels. In another example, certain QIs may always have priority over others, even if their confidence levels are lower than others, as long as they are higher than, say 0.7.

Device Movement Gestures as Indications for Shutter Press and Delete

In another embodiment the user may not need to indicate he is ready by first pressing the shutter. In such cases, the device may assume that the user is ready at any time, or may wait for the device to be stationary hence pointed at some specific point in space for a certain configured time. For example, the user may pull the device out of his pocket and point it to the desired scene and hold it there for a duration of one second. The device hardware may detect that the device has been in motion for a few seconds, and then held relatively still in space, pointing at a certain direction for say one second. The system may assume that the user pulls the device out of his pocket in order to take a picture, and thus goes into "take picture" mode, waiting for the quality indicators to be above the threshold, then taking the picture automatically. The user may hear the sound of a picture being taken and return the device to his pocket. A shake gesture (available in mobile OS like iOS) may be an indication to the device to delete the picture and start again. Alternatively, the shake gesture may be recognized via the device shake QI.

Using the System to Evaluate Video Quality

A quality ranking system over continuous frames, may be used to evaluate a video comprising said frames. One method would be to compute and average the total quality indicators over frames.

In another embodiment a different set of weight functions $w_i$ may be used e.g. different weights for different frames.

Further Examples of System Use are as Follows:

a) If device shake QI is bad or camera focus QI is bad, disregard use of aesthetic QI in total computation, even if user has indicated he would like to give it a high priority. This will prevent the device from taking a picture when the picture is blurry. The suggestion to the user can be "Hold still" or "wait for focus". Once shake is low and focus is optimal, aesthetic QI in total quality computations may be used.

b) Quality reported by lens module 200 showing focus is fine, but independent focus blur QI 244 shows the lens is completely out of focus e.g. due to a poor lens module focus application. Therefore, confidence in the lens focus quality indicator drops and the weight of this indicator in the total quality may be reduced.

c) Device movement QI confidence level computed in 270 is low due to errors in computing location in Device/surrounding objects 4D position computation component 230, or to sub standard accelerometer, but face recognition system 216 with excellent confidence level, insists on a face for 10 frames straight. In this case, use face recognition QI in total QI even if shake in 270 is high, but only at a reduced percentage of, say, 50% of normal face QI.

d) Device movement importance is high if the depth of field of the lens is very small (for instance, in macro photography). For a quality picture, high confidence and low value of device shake QI in 270 are desirable, and their weight in the total QI may be high. User suggestions can be to hold still or use a flash, for example.

e) If previous frames indicated a face in the far left or right of the picture, and now there is no face, it is very possible that the picture has "half a face", amputation, so that may be the feedback to the user. For example, a face has been identified by the face recognizing QI, but attributes low confidence as a result. The system can alert the user of a possible face amputation.

f) A person may want to take a picture of, say, his spouse in a scenic location, or near a historic building. He may choose to give aesthetic QI and recognized person a high priority. This priority may enable to build a total QI with that weight, and to instruct the photographer to move a few meters to the right and left for example, to get an approximated 3D environment in Device/surrounding objects 4D position computation component 230. The device may measure all QI, especially the aesthetic QI, and may instruct the photographer on the best location to stand. This may depend on the place with the best total QI.

The system may if desired be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with but external to the cloud.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware and/or firmware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps or operations of any of the methods shown and described herein, in any suitable order including simultaneous performance of suitable groups of steps as appropriate; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; a processor configured to perform any combination of the described steps or to execute any combination of the described modules; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber. Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A method for presenting a suggestion to a user of a device to move the device to a different location, for use with the device that comprises at least one digital camera module that comprises at least one optical lens and an image sensor coupled to the optical lens for capturing an image, and at least one processor coupled to the image sensor or digital camera for receiving data therefrom, the method by the processor comprising:

calculating from the received image by at least one sensor and lens, a quality indicator QI1 of a camera focus or a quality indicator of blur detection or of both;

calulating an auesthetic quality indicator QI2 that uses a background bluring test of a subject;

calculating a total quality indicator that is based at least partially on at least one of QI1 and QI2;

selecting, based on the total quality indicator, at least one appropriate suggestion from a pre-stored table of suggestions, suggesting to the user to move the device to different location; and presenting the suggestion to the user.

2. The method according to claim 1, where the background blurring test is based at least partially on data from at least one of, the sensor, the optical lens, a lens aperture or any combination thereof.

3. The method according to claim 1, where the total quality indicator also comprises of testing an obstruction of at least one lens.

4. The method according to claim 2, where a new quality indicator QI3 of at least one of the focus distance or the lens aperture are used in determining a depth of field of the image, where the depth of field is computed, based on a movement of the device in z axis, where the z axis is the direction to the subject in scene; and the quality indicator QI3 may be included in the total quality indicator.

5. The method according to claim 2, where a separate QI2 is calculated for each lens and the device has, where QI2 of QI_total or both are based on at least two QI1 from 2 such lenses and sensor modules.

6. The method according to claim 2, where a separate QI1i is calculated for each lens and sensor the device has, where QI1 of QI_total or both are based on at least two QI1i from 2 such lenses and sensor modules.

7. The method according to claim 6, where a confidence level of focus is calculated based on a correlation between each QI2, and the confidence level is used in computation of QI_total.

8. The method according to claim 7, where the total quality indicator also comprises of testing an obstruction of at least one lens.

9. The method according to claim 1, where the total quality indicator also comprises of testing an obstruction of at least one lens.

10. The method according to claim 1, further comprising building at least a partial reconstruction of a 3D scene according to the images from the camera module; wherein the suggestion is further based on the 3D scene reconstruction.

11. The method according to claim 1, wherein the background bluring test uses algorithms of a deep learning.

12. The method according to claim 1, wherein calculating quality indicator QI1 uses algorithms of a deep learning.

* * * * *